(12) United States Patent
Hsieh et al.

(10) Patent No.: US 8,922,740 B2
(45) Date of Patent: Dec. 30, 2014

(54) LIGHT EFFICIENCY ENHANCING OPTICAL DEVICES

(71) Applicant: Industrial Technology Research Institute, Hsinchu (TW)

(72) Inventors: Yi-Ping Hsieh, Changhua County (TW); Hui-Lung Kuo, Taipei (TW); Jui-Fa Chang, Hsinchu (TW); Mei-Chih Peng, Taoyuan County (TW); Yi-Chang Du, Miaoli County (TW)

(73) Assignee: Industrial Technology Research Institute, Hsinchu (TW)

( * ) Notice: Subject to any disclaimer, the term of this patent is extended or adjusted under 35 U.S.C. 154(b) by 210 days.

(21) Appl. No.: 13/712,911

(22) Filed: Dec. 12, 2012

(65) Prior Publication Data

US 2013/0162931 A1    Jun. 27, 2013

(30) Foreign Application Priority Data

Dec. 26, 2011  (TW)  .............................. 100148542 A
Oct. 4, 2012    (TW)  .............................. 101136629 A

(51) Int. Cl.
*G02F 1/1335*  (2006.01)
*G02B 5/30*    (2006.01)
*G02F 1/13363* (2006.01)

(52) U.S. Cl.
CPC ........ *G02F 1/133606* (2013.01); *G02B 5/3016* (2013.01); *G02F 1/133636* (2013.01)
USPC ....................................................... 349/117

(58) Field of Classification Search
USPC ........................................ 349/117, 175, 181
See application file for complete search history.

(56) References Cited

U.S. PATENT DOCUMENTS

| | | |
|---|---|---|
| 5,051,108 A | 9/1991 | Lincoln |
| 5,731,886 A | 3/1998 | Taber et al. |
| 5,808,794 A | 9/1998 | Weber et al. |
| 6,061,108 A | 5/2000 | Anderson et al. |
| 6,088,159 A | 7/2000 | Weber et al. |
| 6,175,400 B1 | 1/2001 | Duncan et al. |
| 6,449,092 B1 | 9/2002 | Weber et al. |
| 6,630,974 B2 | 10/2003 | Galabova et al. |
| 6,669,999 B2 | 12/2003 | Hsieh et al. |
| 7,575,820 B2 | 8/2009 | Silva |
| 2001/0003473 A1 | 6/2001 | Galabova et al. |
| 2005/0140880 A1 | 6/2005 | Lee et al. |
| 2008/0273151 A1 | 11/2008 | Kuo et al. |

OTHER PUBLICATIONS

Hiroyuki Yoshimi et al., "Optical Films for Reflective LCDs to Achieve High Image Quality," SID 02 Digest, May 2002, pp. 862-865, SID, US.
Yonetatsu Matsumoto et al., "Broad Band Selective Reflection from a Single Cholesteric Liquid Crystal Layer with a Helical Pitch Gradient and its Applications," SID 09 Digest, Oct. 2009, pp. 1559-1562, SID, US.

(Continued)

*Primary Examiner* — Phu Vu

(57) ABSTRACT

A light efficiency enhancing optical device is disclosed, including a cholesteric liquid crystal film, a quarter wave plate disposed on a light out-going surface of the cholesteric liquid crystal film and an optical compensating film disposed on a light out-going surface of the quarter wave plate, wherein the optical compensating film includes a positive birefringence C-plate, and a composite optical compensating film with combination of the optical compensating film and the quarter wave plate has in-plane phase retardation $R_0$ of 100 nm~170 nm and out-of-plane phase retardation $R_{th}$ of 0 nm~400 nm.

20 Claims, 3 Drawing Sheets

(56) References Cited

OTHER PUBLICATIONS

Ping-Chen Chen et al., "Color Shift Improvement in a Broadband Cholesteric Liquid Crystal Polarizer through Computational Simulations," Proc. of SPIE, Jan. 2008, pp. 705015-1-705015-8, vol. 7050, SPIE Digital Library, US.

H.Pak et al., "Compensation of Color Shift in a Cholesteric Liquid Crystal Polarizer by Using Stacks of a Quarter-Wave Film with a Low $n_z$ Value," IDW 06, Jan. 2006, pp. 1003-1006, IDW, US.

LIGHT EFFICIENCY ENHANCING OPTICAL DEVICES

CROSS REFERENCE TO RELATED APPLICATIONS

This Application claims priority of Taiwan Patent Application No. 100148542, filed on Dec. 26, 2011, and Taiwan CIP Patent Application No. 101136629, filed on Oct. 4, 2012, the entirety of which is incorporated by reference herein.

TECHNICAL FIELD

The present disclosure relates an optical device and more particularly to a light efficiency enhancing optical device.

BACKGROUND

Since LCD is a non-self-emissive display, a back light unit (BLU) is designed to be a light source of a LCD and will consumes about 50~70% of battery power of a portable 3C device depending on the nature and design of the devices.

A conventional LCD functions by utilizing a polarized light switching mechanism to display images. Polarization occurs as natural light passes through a polarizer, which absorbs one of the polarization states and pass through the other polarization state of the light. In this process, substantially more than half of the incident light is absorbed by the absorptive polarizer. This makes a system low in energy efficiency.

SUMMARY

An embodiment of this disclosure provides a light efficiency enhancing optical device, comprising a cholesteric liquid crystal film, a quarter wave plate disposed on the light out-going surface of the cholesteric liquid crystal film, and an optical compensating film disposed on a light out-going surface of the quarter wave plate, wherein the optical compensating film comprises a positive birefringence C plate. The positive C plate and the quarter wave plate formed an composite optical film, has in-plane phase retardation $R_0$ of 100 nm~170 nm and out-of-plane phase retardation $R_{th}$ of 0 nm~400 nm.

Another embodiment of this disclosure provides a LCD display. The LCD display comprises a reflecting plate, a luminescence unit disposed on the reflecting plate, a diffusion plate disposed overlying the luminescence unit, an light efficiency enhancing optical device disposed on the diffusion plate, a LCD panel disposed on the light efficiency enhancing optical device, and a first polarizer disposed over the LCD panel. The light efficiency enhancing optical device comprises a cholesteric liquid crystal (CLC) film, a quarter wave plate disposed on the light out-going surface of CLC film and an optical compensating film disposed on the light out-going surface of the quarter wave plate, wherein the optical compensating film comprises a positive birefringence C plate. The optical compensating film and the quarter wave plate formed a composite optical film, has in-plane phase retardation $R_0$ of 100 nm~170 nm and out-of-plane phase retardation $R_{th}$ of 0 nm~400 nm.

BRIEF DESCRIPTION OF DRAWINGS

This disclosure can be further understood by the subsequent detailed description and examples with references made to the accompanying drawings, wherein.

DETAILED DESCRIPTION

It is understood that specific embodiments are provided as Examples to teach the broader inventive concept, and one of ordinary skill in the art can easily apply the teaching of the present disclosure to other methods or apparatus. The following discussion is only used to illustrate the disclosure, not to limit this disclosure.

This disclosure provides a light efficiency enhancing optical device, comprising a cholesteric liquid crystal film, a quarter wave plate disposed on the light out-going surface of the cholesteric liquid crystal film, and an optical compensating film disposed on a light out-going surface of the quarter wave plate, wherein the optical compensating film comprises a positive birefringence C plate.

This disclosure provides a light efficiency enhancing optical device, comprising a cholesteric liquid crystal film, a quarter wave plate disposed on the light out-going surface of the cholesteric liquid crystal film, and an optical compensating film disposed on a light out-going surface of the quarter wave plate, wherein the optical compensating film comprises a positive birefringence C plate. the optical compensating film and the quarter wave plate formed an composite optical film, has in-plane phase retardation $R_0$ of 100 nm~170 nm and out-of-plane phase retardation $R_{th}$ of 0 nm~400 nm.

Figure 1:
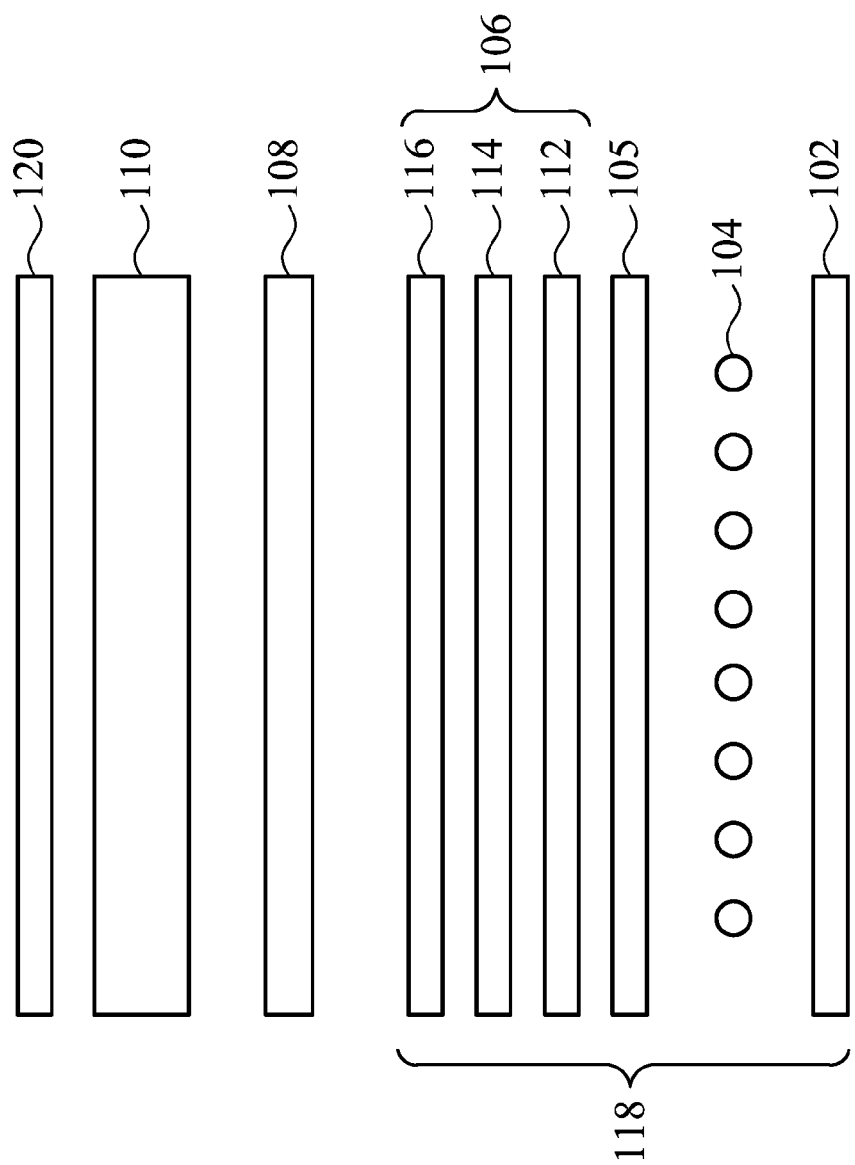
FIG. 1 shows a sketch diagram of a light efficiency enhancing optical device of an embodiment of the disclosure.
Figure 2:
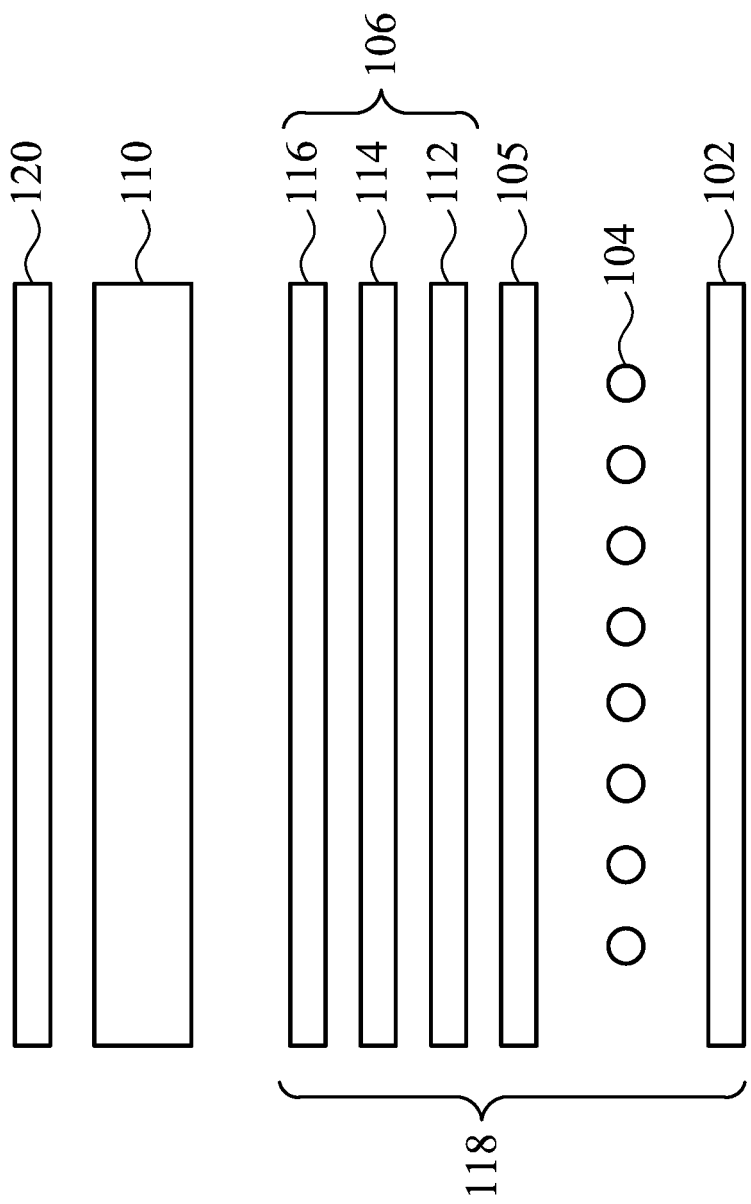
FIG. 2 shows a sketch diagram of a light efficiency enhancing optical device of another embodiment of the disclosure.

Referring to FIG. 1, the disclosure provides LCD display module, sequentially comprising a reflecting plate 102, a back light unit 104, a diffusion plate 105, a light efficiency enhancing optical device 106, a second polarizer 108, a liquid crystal display (LCD) panel 110 and a first polarizer 120 in an embodiment of the invention. In an another embodiment of the invention, as shown in FIG. 2, the LCD panel 110 and the light efficiency enhancing optical device 106 comprise no second polarizer therebetween, wherein only the first polarizer 120 over the LCD panel 110 is provided. The light efficiency enhancing optical device 106 comprises a CLC film 112, a quarter wave plate 114 disposed over the light out-going surface of the CLC film 112, and an optical compensating film 116 disposed over the light out-going surface of the quarter wave plate 114, and the optical compensating film 116 comprises a positive birefringence C plate.

The value of in-plane phase retardation $R_0$ of the positive C plate is small, e.g. 0 nm~10 nm, and the value of out-of-plane phase retardation $R_{th}$ is much big, e.g. 70 nm~450 nm. As a result, the composite optical film composed the positive C plate and the quarter wave plate has in-plane phase retardation $R_0$ of about 100 nm~170 nm and out-of-plane phase retardation $R_{th}$ of 0 nm~400 nm.

The light efficiency enhancing optical device 106, the diffusion plate 105, the luminescence unit 104 and the reflecting plate 102 constitute a back light unit 118 of an embodiment of the disclosure.

In an embodiment of the disclosure, the cholesteric liquid crystal film 112 has gradient pitches and a polarization selective wavelength spectrum within visible light range. In an embodiment of the disclosure, the cholesteric liquid crystal film 112 has a side with shorter pitches facing the luminescence unit.

In another embodiment of the disclosure, the cholesteric liquid crystal film 112 has a side with longer pitches facing the luminescence unit. In an embodiment of the disclosure, the quarter wave plate 114 has a broadband dispersion phase retardation and the cholesteric liquid crystal film has a polarizing selective wavelength spectrum at least in the range from 450 nm to 680 nm In another embodiment of the disclosure, phase retardation of the quarter wave plate 114 is a narrow-band distribution. In an embodiment of the disclosure, the quarter wave plate 114 has in-plane phase retardation of 100 nm~160 nm. In an embodiment of the disclosure, the optical compensating film 116 comprises polymeric nematic liquid crystals with vertical alignment. Out-of-plane phase retardation $R_{th}$ of the optical compensating film 116 is 70 nm~450 nm. In an embodiment of the disclosure, a composite optical compensating film with combination of the optical compensating film 116 and the quarter wave plate 114 has an in-plane phase retardation $R_O$ of about 100 nm~170 nm and an absolute value of an out-of-plane phase retardation $R_{th}$ of 0 nm~400 nm. The light efficiency enhancing optical device structure with low color shift of an embodiment of the disclosure can be used a polarization conversion film used in a LCD polarizing light source, a light efficiency enhancing optical device structure used in a LCD back light module or a brightness enhancement film used in an AMOLED.

EXAMPLE 1

Fabrication of a single-layer cholesteric liquid crystal film which has broadband can take the method disclosed in U.S. Pat. No. 6,669,999 as a reference. The Example uses a polymerizable cholesteric liquid crystal film of R6 (product of Orgchem Technologies Inc., Taiwan) as a main material to be coated on an aligned PET substrate by spin coating. The cholesteric liquid crystal film has a size of 10 cm×10 cm and gradient pitches dispersion, wherein the longer pitches are adjacent to a top surface of the cholesteric liquid crystal film, and the shorter pitcheses are adjacent to a surface of the coating substrate.

The quarter wave plate including a compensating film is produced by the following steps. A quarter wave plate W147 (TEIJIN Chemical Inc., Japan) is used as a substrate, wherein the quarter wave plate is a broadband dispersion retardation film fabricated by stretched polymer film. A liquid crystal material of a +C plate, RMS03-015 (Merck company, Germany) is coated on the quarter wave plate and exposed to UV light under nitrogen ambiance to obtain the quarter wave plate including a compensating film, which has $R_O$ of 143 nm and $R_{th}$ of 302 nm. The quarter wave plate including a compensation film has two surfaces, wherein W147 is on one surface and the positive C plate is on the other surface.

The surface having the material of W147 of the quarter wave plate including a +C compensating film is attached to a surface of the cholesteric liquid crystal film having longer pitches by using UV optical glue, UV298 (Chem-Mat Technologies Co., Taiwan) to form a light efficiency enhancing optical device structure of the Example 1 of the disclosure, wherein the polarized light efficiency enhancing optical device structure has a size of 10 cm×10 cm.

COMPARATIVE EXAMPLE 1

The light efficiency enhancing optical device structure of the Comparative Example 1 uses the same material as the Example 1 but do not include a +C compensating film. A quarter wave plate W147 (TEIJIN Chemical Inc., Japan) having $R_O$ of 140 nm and $R_{th}$ of −69 nm is used to be attached to the longer pitches side of the broadband cholesteric liquid crystal film by using UV optical glue, UV298 (Chem-Mat Technologies Co., Taiwan) to form the light efficiency enhancing optical device structure of the Comparative Example 1. The light efficiency enhancing optical device structure has a size of 10 cm×10 cm.

COMPARATIVE EXAMPLE 2

The light efficiency enhancing optical device structure of the Comparative Example 2 has the structure having +C compensating film between a quarter wave plate and a cholesteric liquid crystal film that disclosed by U.S. Pat. No. 5,731,886. Comparative Example 2 uses the same materials as that in the Example 1, but the +C compensating film side of the quarter wave plate is adhered to the longer pitch side of the cholesteric liquid crystal film by using UV optical glue UV298 (Chem-Mat Technologies Co., Taiwan) to form the light efficiency enhancing optical device structure of the Comparative Example 2. The light efficiency enhancing optical device structure of the Comparative Example 2 has a size of 10 cm×10 cm. The quarter wave plate including a +C compensating film of the Comparative Example 2 has $R_O$ of 143 nm and $R_{th}$ of 302 nm.

The light efficiency enhancing optical device was interposed between the panel comprising the first polarizer and the second polarizer and the luminescence unit comprising the diffusion plate and the reflecting plate according to the set-up of FIG. 1 to form a liquid crystal display module. The liquid crystal display module are measured by Eldim EZcontrast 160 (Eldim Inc.) to compare their luminance and color performance of at all viewing angles. The result is shown in the Table 1 and Table 2 below.

Figure 3:
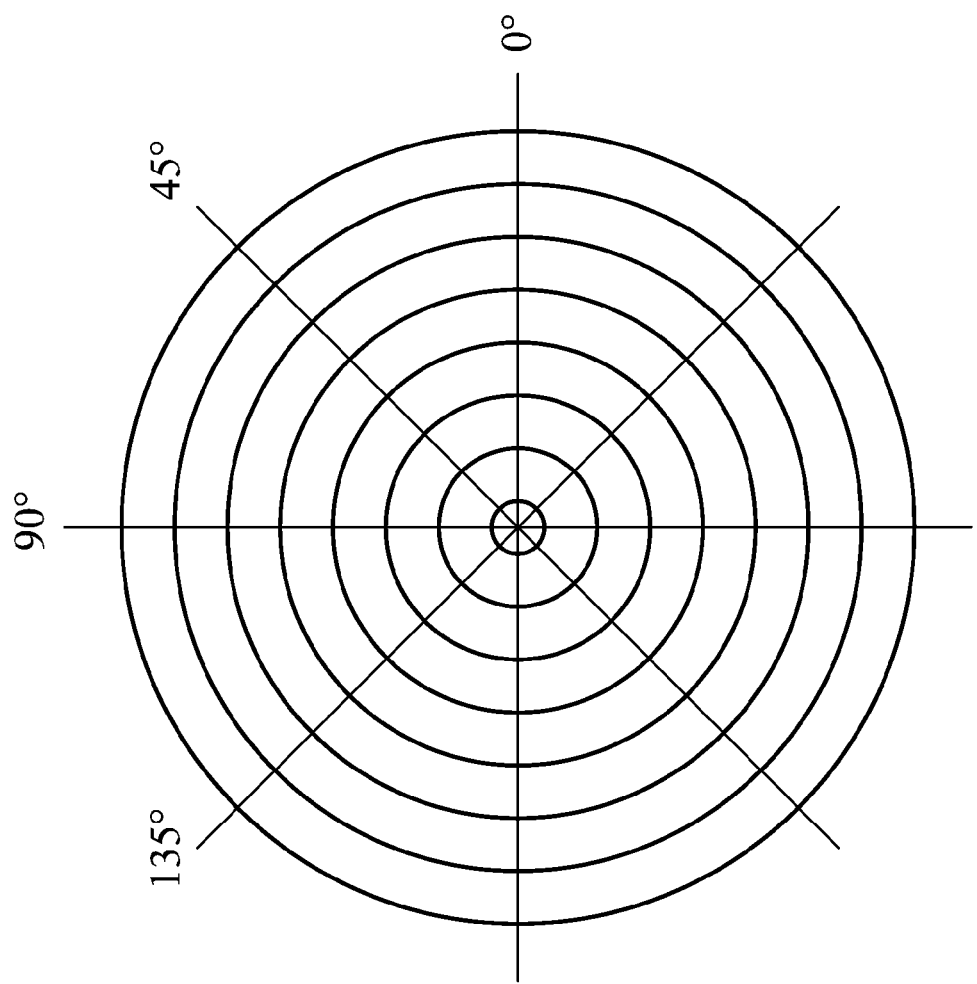
FIG. 3 shows a sketch diagram of method for cutting sections.

The light enhancing efficiency gain is defined by the following formula: light enhancing efficiency gain=$(T_1)/(T_0)$, where $T_0$ is the original luminance value of the set-up which includes the diffusion plate, the luminescence unit, the reflecting plate, and the LCD panel with a first polarizer and a second of polarizer, and $T_1$ is the measured luminance value of the liquid crystal display module with the testing optical device inserted into the gap between the luminescence unit including the diffusion plate and the reflecting plate, and the LCD panel including the first polarizer and the second polarizer. The result can be compared at azimuthal angles of 0°, 45°, 90° and 135° cross-sections (the cutting method to get the sections is shown in FIG. 3), wherein the horizontal axis of the diagram is the viewing angles from −80° to +80° and the vertical axis of the diagram is the light enhancing efficiency gain value.

TABLE 1

(The shorter pitch side of the cholesteric liquid crystal film is toward the light source - 0° cross-section)

| | | Light enhancing efficiency | | |
|---|---|---|---|---|
| Experiment number | Light efficiency enhancing optical device structure | Center [1] (0 ± 10°) | Left large viewing angle [1] (−60 ± 10°) | Right large viewing angle [1] (60 ± 10°) |
| Comparative Example 1 light efficiency enhancing gain | cholesteric liquid crystal film/quarter wave plate ($R_O$ = 140 nm, Rth = −69 nm) | 1.5708 +57.1% | 1.3668 +36.7% | 1.3754 37.5% |

TABLE 1-continued (The shorter pitch side of the cholesteric liquid crystal
film is toward the light source - 0° cross-section)

| | | Light enhancing efficiency | | |
|---|---|---|---|---|
| Experiment number | Light efficiency enhancing optical device structure | Center [1] (0 ± 10°) | Left large viewing angle [1] (−60 ± 10°) | Right large viewing angle [1] (60 ± 10°) |
| Example 1 light efficiency enhancing gain | cholesteric liquid crystal film/quarter wave plate/+C compensating film ($R_0$ = 143 nm, $R_{th}$ = 302 nm) | 1.6284 +62.8% | 1.3466 +34.7% | 1.3583 +35.8% |
| Comparative Example 2 light efficiency enhancing gain | cholesteric liquid crystal film/+C compensating film/ quarter wave plate ($R_0$ = 143 nm, $R_{th}$ = 302 nm) | 1.5880 +58.8% | 1.3065 +30.7% | 1.3166 +31.7% |

Note 1: The center value referred to an average from +10 degree to −10 degree. The value of the right large viewing angle referred to an average +70 degree to +50 degree. The value of the left large viewing angle referred to an average from −70 degree to −50 degree.

Color shift performance of all light efficency enhancing optical devices were also measured by using Eldim EZcontrast 160. Color shift was calculated according to the formula: $du'v'=[(u'-u_0')^2+(v'-v_0')^2]^{0.5}$. Where ($u_0'$, $v_0'$) is the original chromaticity value of the set-up including of a back light unit and a LCD cell with a pair of polarizers, and (u', v') is the measured chromaticity value of the liquid crystal display module with the testing optical device inserted into the gap between the luminescence unit including the diffusion plate and the reflecting plate, and the LCD panel including the first polarizer and the second polarizer. The result can be compared at azimuthal angles of 0°, 45°, 90° and 135° cross-sections (the cutting method to get the sections is shown in FIG. 3), wherein the horizontal axis of the diagram is the viewing angles from −80° to +80° and the vertical axis of the diagram is the color difference du'v', i.e., color shift value.

TABLE 2

(The shorter pitch side of the cholesteric liquid crystal film
is toward the light source - 0°section, 45°section,
90°section, 135° cross-section)

| Measuring area (intersection angle to a vertical line) | Section angle | Example 1 | Comparative Example 1 | Comparative Example 2 |
|---|---|---|---|---|
| Center[1] (0 ± 10°) | 0 | 0.0084 | 0.0064 | 0.0107 |
| | 45 | 0.0063 | 0.0059 | 0.006 |
| | 90 | 0.0107 | 0.01 | 0.0102 |
| | 135 | 0.0082 | 0.0083 | 0.0088 |
| | Average value → | 0.0084 | 0.0077 | 0.0089 |
| Left large viewing angle[1] (−60 ± 10°) | 0 | 0.0238 | 0.0373 | 0.0269 |
| | 45 | 0.0239 | 0.0223 | 0.0363 |
| | 90 | 0.0161 | 0.0137 | 0.0262 |
| | 135 | 0.0251 | 0.024 | 0.0241 |
| | Average value → | 0.0222 | 0.0243 | 0.0284 |

TABLE 2-continued (The shorter pitch side of the cholesteric liquid crystal film
is toward the light source - 0°section, 45°section,
90°section, 135° cross-section)

| Measuring area (intersection angle to a vertical line) | Section angle | Example 1 | Comparative Example 1 | Comparative Example 2 |
|---|---|---|---|---|
| Right large viewing angle [1] (60 ± 10°) | 0 | 0.0200 | 0.0369 | 0.0288 |
| | 45 | 0.0229 | 0.0226 | 0.0412 |
| | 90 | 0.0138 | 0.0164 | 0.0298 |
| | 135 | 0.0224 | 0.0246 | 0.0234 |
| | Average value → | 0.0198 | 0.0251 | 0.0308 |

Note 1: The center value referred to an average from +10 degree to −10 degree. The value of the right large viewing angle referred to an average +70 degree to +50 degree. The value of the left large viewing angle referred to an average from −70 degree to −50 degree.

According to Table 1 and Table 2 above, the conditions having a cholesteric liquid crystal film with the shorter pitch side toward light source have better light efficiency enhancement. Compared to the structure without a +C compensating film (Comparative Example 1) and the structure with a +C compensating film (Comparative Example 2, i.e. the prior art U.S. Pat. No. 5,731,886), the structure with a +C compensating film (Example 1 of the disclosure) has average color shifts of 0.0222 and 0.0224 at left large viewing angles and right viewing angles along the four cross-sections and has a much better effect of improving large viewing angle color shift than the others.

EXAMPLE 2

The cholesteric liquid crystal film for Example 2 is the same as Example 1, but the shorter-pitch side of the cholesteric liquid crystal film is exposed as an attaching surface of the structure of Example 2 by using a glue attaching method. The quarter wave plate including a +C compensating film for Example 2 is fabricated by the following steps. A +A-plate liquid crystal material LC242 (BASF company, Germany, having a concentration of 20% in a toluene solution) is coated on an aligned triacetyl cellulose (TAC) substrate and then is exposed to UV light under nitrogen ambiance for 1 min to form a quarter wave plate. The quarter wave plate has a narrowband dispersion phase retardation and a size of 10 cm×10 cm. Next, liquid crystal material of +C plate, RMS03-015 (Merck company, Germany) is coated under a rotation speed of 400 rpm on the quarter wave plate and exposed to UV light in nitrogen ambiance to obtain the quarter wave plate including a compensating film, The quarter wave plate including a +C compensating film has $R_0$ of 126 nm and $R_{th}$ of 258 nm.

The optical film achieved above is used to laminate with the cholesteric liquid crystal film to give the light efficiency enhancing optical device structure. In this lamination, the TAC substrate side of the quarter wave plate is attached to the shorter pitch side of the cholesteric liquid crystal film to form the structure of Example 2. The light efficiency enhancing film has a size of 10 cm×10 cm.

COMPARATIVE EXAMPLE 3

The light efficiency enhancing optical device structure (a structure without a +C compensating film) of the Comparative Example 3 uses the same material as the Example 2 but do not include a +C compensating film. A +A-plate liquid crystal material LC242 (BASF company, having a concentration of 20% in toluene solution) is coated on an aligned triacetyl cellulose (TAC) substrate and then is exposed to UV light under nitrogen ambiance for 1 min to form a quarter wave plate. The quarter wave plate has a narrowband dispersion phase retardation and has $R_0$ of 125 nm and $R_{th}$ of −63 nm. Next, the surface of TAC substrate side of the quarter wave plate without a +C compensating film is attached to the surface of the cholesteric liquid crystal film having a shorter-pitch side to form the light efficiency enhancing optical device structure of Comparative Example 3. The light efficiency enhancing optical device structure has a size of 10 cm×10 cm.

COMPARATIVE EXAMPLE 4

The light efficiency enhancing optical device structure of the Comparative Example 4 is the structure having +C compensating film between a quarter wave plate and a cholesteric liquid crystal film discloses in U.S. Pat. No. 5,731,886. The light efficiency enhancing optical device structure of Comparative Example 4 uses the same materials as that in the Example 2, but the +C compensating film side of the quarter wave plate is adhered to the shorter pitch side of the cholesteric liquid crystal film by using UV optical glue UV298 (Chem-Mat Technologies Co., Taiwan) to form the light efficiency enhancing optical device structure of the Comparative Example 4. The light efficiency enhancing optical device structure of the Comparative Example 4 has a size of 10 cm×10 cm. The quarter wave plate including a +C compensating film of the Comparative Example 4 has $R_0$ of 126 nm and $R_{th}$ of 258 nm.

The light efficiency enhancing optical device was interposed between the panel comprising the first polarizer and the second polarizer, and the luminescence unit comprising the diffusion plate and the reflecting plate according to the set-up of FIG. 1 to form a liquid crystal display module. The the optical crystal display module above is measured by Eldim EZcontrast 160 (Eldim Inc.) to compare luminance and color performance of at all viewing angles. The result is shown in the Table 3 and Table 4 below.

The light enhancing efficiency gain is defined by the following formula: light enhancing efficiency gain=$(T_1)/(T_0)$, where $T_0$ is the original luminance value of the set-up including the diffusion plate, the luminescence unit, the reflecting plate, and the LCD panel with a first polarizer and a second of polarizer, and $T_1$ is the measured luminance value of the set-up with the testing optical device inserted into the gap between the luminescence unit including a diffusion plate and the reflecting plate, and the LCD panel including the first polarizer and the second polarizer. The result can be compared at azimuthal angles of 0°, 45°, 90° and 135° cross-sections (the cutting method to get the sections is shown in FIG. 3), wherein the horizontal axis of the diagram is the viewing angles from −80° to +80° and the vertical axis of the diagram is the light enhancing efficiency gain value.

TABLE 3

(The longer pitch side of the cholesteric liquid crystal film is toward the light source - 0° cross-section)

| Experiment number | Light efficiency enhancing optical device structure | Light enhancing efficiency | | |
|---|---|---|---|---|
| | | Center [1] | Left large viewing angle [1] | Right large viewing angle [1] |
| Comparative Example 3 light efficiency enhancing gain | cholesteric liquid crystal film/quarter wave plate ($R_0$ = 125 nm, Rth = −63 nm) | 1.4612 +46.1% | 0.8172 −28.3% | 0.8515 −14.9% |
| Example 2 light efficiency enhancing gain | cholesteric liquid crystal film/quarter wave plate/optical compensating film ($R_0$ = 126 nm, $R_{th}$ = 258 nm) | 1.4628 +46.3% | 1.2227 +22.3% | 1.2178 +21.8% |
| Comparative Example 4 light efficiency enhancing gain | cholesteric liquid crystal film/optical compensating film/ quarter wave plate ($R_0$ = 126 nm, $R_{th}$ = 258 nm) | 1.4550 +45.5% | 1.2597 +26% | 1.2417 +24.2% |

Note 1: The center value referred to an average from +10 degree to −10 degree. The value of the right large viewing angle referred to an average +70 degree to +50 degree. The value of the left large viewing angle referred to an average from −70 degree to −50 degree.

Color shift performance of all light efficiency enhancing optical devices were also measured by using Eldim EZcontrast 160. Color shift was calculated according to the formula: $du'v'=[(u'-u_0')^2+(v'-v_0')^2]^{0.5}$. Where $(u_0 40, v_0')$ is the original chromaticity value of the set-up simply including a diffusion plate, a luminescence unit, a reflecting plate and a LCD panel with the first polarizer and the second polarizer, and (u', v') is the measured chromaticity value of the liquid crystal display module with the testing optical device inserted into the gap between the luminescence unit including the diffusion plate and the reflecting plate, and the LCD panel including the first polarizer and the second polarizer. The result can be compared at azimuthal angles of 0°, 45°, 90° and 135° cross-sections (the cutting method to get the sections is shown in FIG. 3), wherein the horizontal axis of the diagram is the viewing angles from −80° to +80° and the vertical axis of the diagram is the color difference du'v', i.e., color shift value.

TABLE 4

(The longer pitch side of the cholesteric liquid crystal film is toward the light source - 0° section, 45°section, 90°section, 135° cross-section)

| Measuring area (intersection angle to a vertical line) | Section angle | Example 2 | Comparative Example 3 | Comparative Example 4 |
|---|---|---|---|---|
| Center (0 ± 10°) | 0 | 0.0054 | 0.0060 | 0.0065 |
| | 45 | 0.0050 | 0.0055 | 0.0070 |
| | 90 | 0.0048 | 0.0056 | 0.0070 |
| | 135 | 0.0056 | 0.0059 | 0.0066 |
| | Average value → | 0.0052 | 0.0058 | 0.0068 |
| Left large viewing angle (−60 ± 10°) | 0 | 0.0154 | 0.0223 | 0.0247 |
| | 45 | 0.0158 | 0.0099 | 0.0283 |
| | 90 | 0.0111 | 0.0155 | 0.0156 |
| | 135 | 0.0160 | 0.0288 | 0.0199 |
| | Average value → | 0.0146 | 0.0191 | 0.0221 |
| Right large viewing angle (60 ± 10°) | 0 | 0.0166 | 0.0195 | 0.0206 |
| | 45 | 0.0050 | 0.0126 | 0.0272 |
| | 90 | 0.0125 | 0.0195 | 0.0181 |
| | 135 | 0.0144 | 0.0292 | 0.0237 |
| | Average value → | 0.0121 | 0.0202 | 0.0224 |

According to Table 3, when the longer-pitch side of the cholesteric liquid crystal film is toward the light source at azimuthal angles of 0 ° cross-section, the light efficiency enhancing optical device with a +C compensating film,(Example 2 and the Comparative Example 4), provide a greater effect of improving large angle brightness than the other without a +C compensating film(the Comparative Example 3).

According to Table 4, the light efficiency enhancing optical device structure of the Example 2 having a +C compensating film provides a much better effect of improving large angle color shift than those of Comparative Example 3 and Comparative Example 4. The light efficiency enhancing optical device structure of the Example 2 has average color shifts of 0.0052, 0.0146 and 0.0121 at center, left large viewing angles and right viewing angles along the four cross-sections. The light efficiency enhancing optical device structure of the Comparative Example 4 has average color shifts of 0.0068, 0.0241 and 0.0224 at center, left large viewing angles and right viewing angles along the four cross-sections. Further, Example 2 has a much better effect on improvement of color shift than Comparative Example 4 (i.e. the prior art U.S. Pat. No. 5,731,886).

The optical compensating structure comprising a cholesteric liquid crystal film, a quarter wave plate and an optical compensating film of the Example 2 can effectively improve color performance at azimuthal angles of 0°, 45°, 90° and 135° cross-sections and Example 2 has the best effect among the three structures of Example 2, Comparative Example 3 and Comparative Example 4. Thus, the optical compensating structure of the disclosure can further improve the color shift issue in the prior art.

While the disclosure has been described by way of example and in terms of the preferred embodiments, it is to be understood that the disclosure is not limited to the disclosed embodiments. It is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A light efficiency enhancing optical device, comprising:
a cholesteric liquid crystal film;
a quarter wave plate disposed on the light out-going surface of the cholesteric liquid crystal film; and
an optical compensating film disposed on the light out-going surface of the quarter wave plate, wherein the optical compensating film comprises a positive birefringence C-plate,
wherein a composite optical compensating film with combination of the optical compensating film and the quarter wave plate has in-plane phase retardation $R_0$ of 100 nm~170 nm and out-of-plane phase retardation $R_{th}$ of 0 nm~400 nm.

2. The light efficiency enhancing optical device as claimed in claim 1, wherein the cholesteric liquid crystal film has broadband characteristics and has a polarizing selective wavelength spectrum in a wavelength range from 450 nm to 680 nm.

3. The light efficiency enhancing optical device as claimed in claim 1, wherein the cholesteric liquid crystal film has gradient pitches.

4. The light efficiency enhancing optical device as claimed in claim 1, wherein the optical compensating film is formed by nematic liquid crystals with vertical alignment.

5. The light efficiency enhancing optical device as claimed in claim 1, further comprising optical glue between the cholesteric liquid crystal film and the quarter wave plate.

6. The light efficiency enhancing optical device as claimed in claim 1, the quarter wave plate is directly contacted to the cholesteric liquid crystal film without any glue.

7. The light efficiency enhancing optical device as claimed in claim 1, wherein the cholesteric liquid crystal film has shorter pitches at a surface facing a luminescence unit.

8. The light efficiency enhancing optical device as claimed in claim 1, wherein the cholesteric liquid crystal film has longer pitches at a surface facing a luminescence unit.

9. The light efficiency enhancing optical device as claimed in claim 1, wherein the quarter wave plate has a broadband dispersion phase retardation.

10. The light efficiency enhancing optical device as claimed in claim 1, wherein an optical film having the quarter wave plate in combination of the optical compensating film has a broadband dispersion phase retardation.

11. The light efficiency enhancing optical device as claimed in claim 1, wherein the quarter wave plate has a narrowband dispersion phase retardation.

12. The light efficiency enhancing optical device as claimed in claim 1, wherein an optical film having the quarter wave plate in combination of the optical compensating film has a narrowband dispersion phase retardation.

13. A liquid crystal display device, comprising:
a reflecting plate;
a luminescence unit disposed on the reflecting plate;
a diffusion plate disposed overlying the luminescence unit;
an light efficiency enhancing optical device disposed on the diffusion plate,
wherein the light efficiency enhancing optical device comprises:
a cholesteric liquid crystal film;
a quarter wave plate disposed on a light out-going surface of the cholesteric liquid crystal film; and
an optical compensating film disposed on a light out-going surface of the quarter wave plate, wherein the optical compensating film comprises a positive birefringence C-plate, wherein a composite optical compensating film with combination of the optical compensating film and the quarter wave plate has in-plane phase retardation $R_0$ of 100 nm~170 nm and out-of-plane phase retardation $R_{th}$ of 0 nm~400 nm;
a LCD panel disposed over the light efficiency enhancing optical device; and
a first polarizer disposed over the LCD panel.

14. The liquid crystal display device as claimed in claim 13, wherein the cholesteric liquid crystal film has broadband characteristics and has a polarizing selective wavelength spectrum in a wavelength range from 450 nm to 680 nm.

15. The liquid crystal display device as claimed in claim 13, wherein the cholesteric liquid crystal film has gradient pitches.

16. The liquid crystal display device as claimed in claim 13, wherein the optical compensating film is formed by nematic liquid crystals with vertical alignment.

17. The liquid crystal display device as claimed in claim 13, further comprising optical glue between the cholesteric liquid crystal film and the quarter wave plate.

18. The liquid crystal display device as claimed in claim 13, wherein the quarter wave plate is directly contacted the cholesteric liquid crystal film without any glue.

19. The liquid crystal display device as claimed in claim 13, wherein the cholesteric liquid crystal film of the light efficiency enhancing optical device has shorter pitches at a surface facing the luminescence unit.

20. The liquid crystal display device as claimed in claim 13, further comprising a second polarizer disposed between the light efficiency enhancing optical device and the LCD panel.

* * * * *